US008938489B2

(12) United States Patent
Suit et al.

(10) Patent No.: US 8,938,489 B2
(45) Date of Patent: Jan. 20, 2015

(54) MONITORING SYSTEM PERFORMANCE CHANGES BASED ON CONFIGURATION MODIFICATION

(75) Inventors: John M. Suit, Mount Airy, MD (US); Mark J. Yourcheck, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 12/905,688

(22) Filed: Oct. 15, 2010

(65) Prior Publication Data

US 2012/0096065 A1    Apr. 19, 2012

(51) Int. Cl.
*G06F 15/16* (2006.01)
*G06F 15/177* (2006.01)
*G06F 15/173* (2006.01)
*H04L 12/64* (2006.01)
*H04L 12/24* (2006.01)

(52) U.S. Cl.
CPC ........ *H04L 12/6418* (2013.01); *H04L 41/0853* (2013.01); *H04L 41/0859* (2013.01); *H04L 41/046* (2013.01)
USPC ............................. 709/202; 709/220; 709/223

(58) Field of Classification Search
USPC ........................... 709/202, 220, 221, 223, 224
See application file for complete search history.

(56) References Cited

U.S. PATENT DOCUMENTS

| 6,513,059  | B1  | 1/2003  | Gupta et al.         |
|------------|-----|---------|----------------------|
| 6,658,465  | B1* | 12/2003 | Touboul ........... 709/223 |
| 6,871,223  | B2* | 3/2005  | Drees ............... 709/223 |
| 7,082,463  | B1* | 7/2006  | Bradley et al. ....... 709/223 |
| 7,571,349  | B2  | 8/2009  | Levidow et al.       |
| 7,624,172  | B1  | 11/2009 | Austin-lane          |
| 7,769,720  | B2  | 8/2010  | Armington            |
| 7,793,162  | B2  | 9/2010  | Mock et al.          |
| 7,826,602  | B1  | 11/2010 | Hunyady et al.       |
| 7,890,318  | B2  | 2/2011  | Castellani et al.    |
| 7,953,696  | B2  | 5/2011  | Davis et al.         |
| 7,975,058  | B2  | 7/2011  | Okmianski et al.     |
| 8,156,378  | B1  | 4/2012  | Suit                 |
| 8,185,442  | B2  | 5/2012  | Kiran Vedula         |
| 8,234,377  | B2  | 7/2012  | Cohn                 |
| 8,295,277  | B2  | 10/2012 | Vadlakonda et al.    |
| 8,656,009  | B2  | 2/2014  | Suit                 |
| 8,656,219  | B2  | 2/2014  | Suit                 |
| 2003/0177112 | A1 | 9/2003 | Gardner              |
| 2003/0225876 | A1 | 12/2003 | Oliver et al.       |
| 2004/0133672 | A1 | 7/2004 | Bhattacharya         |
| 2005/0044206 | A1 | 2/2005 | Johansson            |
| 2005/0240606 | A1 | 10/2005 | Edelstein           |
| 2005/0268298 | A1 | 12/2005 | Hunt et al.         |
| 2006/0069768 | A1 | 3/2006 | Wen et al.           |
| 2006/0074833 | A1 | 4/2006 | Gardner et al.       |

(Continued)

OTHER PUBLICATIONS

Red Hat Office Action for U.S. Appl. No. 12/905,565, mailed Oct. 12, 2012.

(Continued)

*Primary Examiner* — Yemane Mesfin
*Assistant Examiner* — Peter Chen
(74) *Attorney, Agent, or Firm* — Lowenstein Sandler LLP

(57) ABSTRACT

At least one agent is deployed to one or more nodes of a network. At least one message is received from the agent, and at least one configuration change is determined from the message. Next, a record comprising one or more parameters of the configuration change is generated and stored in a database.

19 Claims, 9 Drawing Sheets

(56) References Cited

U.S. PATENT DOCUMENTS

| | | | |
|---|---|---|---|
| 2006/0195715 A1 | 8/2006 | Herington | |
| 2006/0230134 A1* | 10/2006 | Qian et al. | 709/224 |
| 2007/0083506 A1 | 4/2007 | Liddell | |
| 2007/0118394 A1* | 5/2007 | Cahoon | 705/1 |
| 2007/0220121 A1 | 9/2007 | Suwarna | |
| 2008/0256010 A1* | 10/2008 | Moran et al. | 706/46 |
| 2009/0028053 A1 | 1/2009 | Kannan et al. | |
| 2009/0182880 A1* | 7/2009 | Inamdar et al. | 709/226 |
| 2009/0204701 A1 | 8/2009 | Herzog et al. | |
| 2009/0228579 A1 | 9/2009 | Sanghvi et al. | |
| 2009/0228589 A1 | 9/2009 | Korupolu | |
| 2009/0307772 A1 | 12/2009 | Markham et al. | |
| 2010/0049731 A1 | 2/2010 | Kiran Vedula | |
| 2010/0138390 A1* | 6/2010 | Lobo et al. | 707/640 |
| 2010/0161604 A1 | 6/2010 | Mintz et al. | |
| 2010/0287263 A1 | 11/2010 | Liu et al. | |
| 2010/0318609 A1 | 12/2010 | Lahiri et al. | |
| 2012/0096134 A1 | 4/2012 | Suit | |
| 2012/0096142 A1 | 4/2012 | Suit | |
| 2012/0096143 A1 | 4/2012 | Suit | |
| 2012/0096171 A1 | 4/2012 | Suit | |
| 2012/0221898 A1 | 8/2012 | Suit | |
| 2013/0060839 A1 | 3/2013 | Biljon et al. | |

OTHER PUBLICATIONS

Red Hat Office Action for U.S. Appl. No. 12/905,565, mailed Apr. 11, 2013.
Red Hat Office Action for U.S. Appl. No. 12/905,645, mailed Sep. 13, 2012.
Red Hat Office Action for U.S. Appl. No. 12/905,645, mailed Mar. 26, 2013.
Red Hat Office Action for U.S. Appl. No. 12/905,761, mailed Oct. 22, 2012.
Red Hat Office Action for U.S. Appl. No. 12/905,761, mailed Apr. 11, 2013.
Red Hat Office Action for U.S. Appl. No. 12/905,850, mailed Dec. 6, 2012.
Red Hat Office Action for U.S. Appl. No. 12/905,879, mailed Jul. 8, 2011.
Red Hat Notice of Allowance for U.S. Appl. No. 12/905,879, mailed Dec. 8, 2011.
Red Hat Office Action for U.S. Appl. No. 13/439,803, mailed Aug. 31, 2012.
Red Hat Notice of Allowance for U.S. Appl. No. 13/439,803, mailed Feb. 21, 2012.
Red Hat Office Action for U.S. Appl. No. 12/905,565, mailed Sep. 27, 2013.
Red Hat Notice of Allowance for U.S. Appl. No. 12/905,565, mailed Apr. 18, 2014.
Red Hat Notice of Allowance for U.S. Appl. No. 12/905,761, mailed Oct. 4, 2013.
Red Hat Office Action for U.S. Appl. No. 12/905,850, mailed Jul. 30, 2013.
Red Hat Office Action for U.S. Appl. No. 12/905,850, mailed Feb. 18, 2014.

* cited by examiner

MONITORING SYSTEM PERFORMANCE CHANGES BASED ON CONFIGURATION MODIFICATION

CROSS-REFERENCE TO RELATED APPLICATIONS

This application relates to applications:

U.S. patent application Ser. No. 11/767,173, filed on Jun. 22, 2007, now issued U.S. Pat. No. 8,191,141 titled "Method and system for cloaked observation and remediation of software attacks"; U.S. patent application Ser. No. 11/867,456, filed on Oct. 4, 2007, now issued U.S. Pat. No. 8,336,108 titled "Method and system for collaboration involving enterprise nodes"; and U.S. patent application Ser. No. 12/626,872, filed on Nov. 27, 2009, now issued U.S. Pat. No. 8,429,748 titled "Network traffic analysis using a dynamically updating ontological network description".

This application further relates to the Applicant's co-pending applications:

U.S. patent application Ser. No. 12/905,565, filed on Oct. 15, 2010 titled "Identification of business process application service groups"; U.S. patent application Ser. No. 12/905,645, filed on Oct. 15, 2010 titled "System and method for migration of network entities to a cloud infrastructure"; U.S. patent application Ser. No. 12/905,761, filed on Oct. 15, 2010 titled Indicating the impact to a business application service group resulting from a change in state of a single business application service group node"; U.S. patent application Ser. No. 12/905,850, filed on Oct. 15, 2010 titled "System and method for enterprise nodes that are contained within a public cloud to communicate with private enterprise infrastructure dependencies"; U.S. patent application Ser. No. 12/905,879, filed on Oct. 15, 2010 titled "System and method for determination of the root cause of an overall failure of a business application service".

The entire contents of each of the above mentioned applications are specifically incorporated herein by reference.

FIELD OF THE INVENTION

Embodiments of the invention relate generally to network traffic analysis and, in particular, to methods and apparatus for analyzing system performance changes.

BACKGROUND

Traditionally there are two methods of enterprise management solutions to gather application information. The first is by analyzing network traffic that is associated between two or more nodes on a given enterprise network. This method creates ambiguity when determining what applications on the nodes are actually creating the traffic as well as difficulty in determining when a change has accrued. The second is by polling the Application Interface of the operating system to determine what applications are installed and have the potential of executing on the nodes.

In both cases, these methods do not allow for the variations of custom applications that are utilized by enterprise networks. For example these traditional methods may determine if a commonly used application is present but have no ability to determine if custom applications such as those created for a specific business process (banking, defense, healthcare, and industrial automated systems) are being executed.

The methods to determine that configuration changes have occurred are fairly uniform. Typically, a list is created and referenced when new information is gathered.

Once a list of the changes in application and configuration are created, they are typically used only for reporting purposes. They do not correlate the changes in the performance of the given node to the change in application or system configuration of the node.

BRIEF DESCRIPTION OF THE DRAWINGS

Reference will now be made, by way of example only, to specific embodiments and to the accompanying drawings in which.

DETAILED DESCRIPTION

Figure 1:
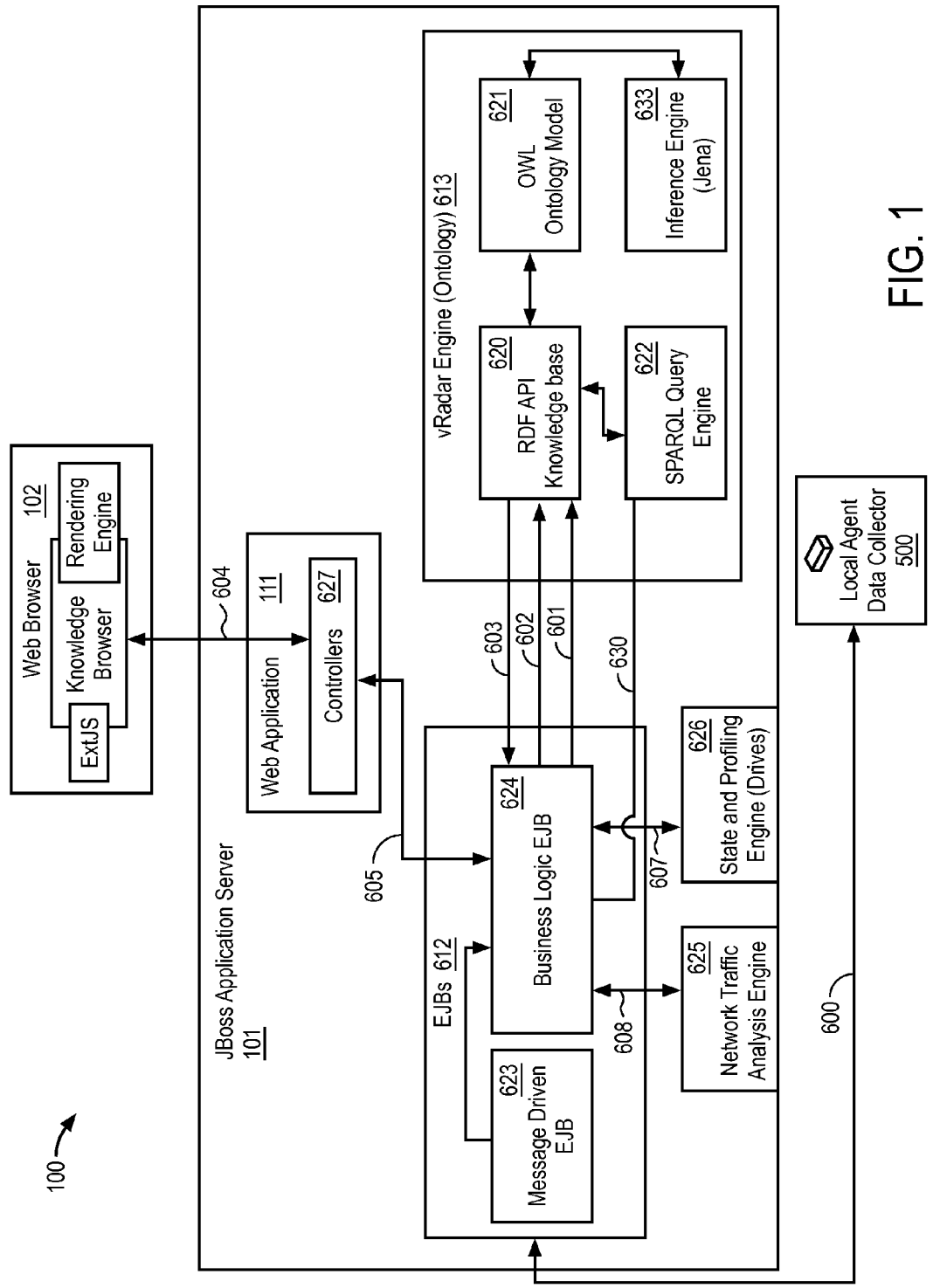
FIG. 1 depicts a network of nodes including an administration system.

A method and system for detecting configurations changes at nodes of a network are discussed herein. In one embodiment, one or more agents are deployed to one or more of a plurality of nodes of the network. The agents provide configuration messages that specify a configuration of their respective node. The configuration messages are processed to determine whether changes to the configuration have occurred at the node. Records representing the configuration changes are generated and stored in a database.

In one embodiment, a system performance parameter is correlated with configuration changes on the system. In particular, an agent can be deployed to a node of a network that is configured to communicate the configuration of the respective node in a communication message. The configuration messages are received at an administration console and processed to determine if a configuration change has occurred on at least one node of the network. At least one system performance parameter is determined for the node and visualized on a timeline that also provides an indication of a time of a configuration change.

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. Furthermore, "connected" or "coupled" as used herein may include wirelessly connected or coupled. It will be understood that although the terms "first" and "second" are used herein to describe various elements, these elements should not be limited by these terms. These terms are used only to distinguish one element from another element. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

In one embodiment, an enterprise IT infrastructure environment, including networks of computer entities consisting of physical and/or virtual machines located at network nodes, may be advantageously described via an ontology that describes the operational usage and current state of the entities rather than being based on a fixed IT infrastructure architecture. The ontological description may be automatically and dynamically updated based on data acquired from data collection agents deployed to the nodes of the network. The data collection agents observe communicative relationships based on connections between nodes in operational use, while annotating a class state. Using the ontological description, a network analyst or system operator may be provided with an improved ability to analyze network traffic.

Advantageously, data relating to actual connections may be acquired automatically in near real time. For example, an actual connection may be monitored in an interrupt-driven way while collecting information regarding an application that made the connection. Moreover a "volume for the connections" may be derived.

A software based data collection agent may be received by a computing device at a node within a communications network. The agent may be distributed to one or more nodes from a central node via the network. Once the software based data collection agent is received, it may be inserted in an operating system of the receiving node. Advantageously, the agent may be inserted in the kernel of the operating system or in a user space (i.e., an area in virtual memory of a computer that contains user applications that execute at the application layer). The installation may be such that it is transparent to, or undetected by a user of the node. The installed data collection agent may monitor data packet traffic between an adaptive driver layer and a protocol layer and report results of the monitoring to the central node.

In one example, the data collection agent may have an interface to an operating system's network stack and may periodically determine what applications are using the network stack. Thereby the data collection agent may track information regarding a network connection, the connection duration, and any applications and systems involved in the connection. Moreover, the data collection agent may normalize the foregoing information and report it to an administration console so that different operating systems may be correlated by the administration console.

As a further example, the data collection agent may include a network filter inserted into the network stack to determine exactly when a connection is made between entities. The filter component of the data collection agent may be inserted at one or more layers of the OSI model. For example a data collection agent may have filter interface at the transport layer and/or a filter interface at the network layer. Thereby, the data collection agent may track information regarding a network connection, the connection duration, and any applications and systems involved in the connection. Moreover, the data collection agent may normalize the foregoing information and report it to the administration console so that different operating systems may be correlated by the administration console.

As a yet further example, the data collection agent described in the preceding paragraph may also include a packet filter inserted into the network stack to track connection data. For example, a data collection agent may have a filter interface at the data link layer. Then, the data collection agent may correlate and normalize (if required) data from the network filter and the packet filter to track information regarding the network connection, the connection duration, any applications and systems involved in the connection, connection status and connection resource usage information. Moreover, the data collection agent may normalize the foregoing information and report it to the administration console so that different operating systems may be correlated by the administration console.

Referring now to FIG. 1, an illustrative system 100 for deploying data collection agents onto network nodes, monitoring network connections instantiated at each network node, acquiring resulting data, automatically creating an ontological description of the network from the acquired data and dynamically updating the ontological description will be described. The system 100 may further be used for monitoring configuration drifts within an enterprise network as will be described in more detail below. In an embodiment, elements of system 100 utilize the Java software platform and Enterprise Java Bean (EJB) architecture to provide certain functionality, and these well-known terms may be used in the description that follows. Other software platforms and architectures such as JBoss Java Platform, Enterprise Edition, providing similar functionality may be used without departing from the scope of the present invention.

System 100 may comprise an application server 101, which interacts across a network with a number of data collection agents 500 deployed in various nodes of the network. Advantageously, application server 101, may be an element of an administrative console (AC) that also provides a suite of network management tools. A system administrator may perform network traffic analysis and/or other network management tasks by accessing application server 101 by way of web browser 102. Application server 101 may comprise an EJB module 612, an ontological description creation engine 613, and a web application 111.

Data collection agents 500, as described hereinabove, may be deployed onto network nodes including physical and/or virtual machines in an enterprise IT infrastructure environment. After such deployment, application server 101 receives messages from data collection agents 500. These messages may include data representing, for example, state and relationship information about the network nodes, configuration information related to the IT infrastructure, performance/utilization data and network communication.

The received messages may be initially handled by EJB module 612. For example, message driven EJB 623 may initially inspect a received message. A received message relating to network traffic or node status may be forwarded by message driven EJB 623 to the Business Logic EJB 624. Business Logic EJB 624 may call Network Traffic Analysis Engine 625 for messages relating to network traffic. Alternately, "infrastructure messages" (i.e., those relating to node status) may be forwarded directly to the State and Profiling Engine 626.

Messages forwarded to the state and profiling engine 626 may there undergo sorting and processing. The state and profiling engine 626, for example, may identify the entities within the IT Infrastructure as well as their dependency on one another, based on messages received from the platform. In addition, state and profiling engine 626 may perform further processing to determine the state of one or more entities. State may be based on a threshold that has been defined, for example, by the system administrator. The threshold may consist of a metric that either exceeds or underperforms in a specific area of interest to the system administrator. An example would be where a server in a network is exceeding a specified CPU utilization percentage.

A data output from state and profile engine 626 may be sent via signal flow paths 607 and 601 to ontological description creation engine 613. Initially, the data may be handled by Resource Description Framework (RDF) API knowledge base 620 where the data is categorized and stored utilizing a predefined entity relationship, determined by Ontology Web Language (OWL) API 621.

Messages handled by the Network Traffic Analysis Engine 625 may include source-to-destination data, qualified by a communicating application within the operating system of the originating node, as well as frequency of communication information. This data is analyzed by processing the number and type of connections to determine if an Ontological "communicates_with" relationship exists. A determination may be made by tracking the number of connections of a specific application over a period of time. The period of time may be a system default time or may be preselected, for example, by the system administrator. Importantly, by analyzing such data as source-to-destination data, "communicates_with" relationships can be revealed between two or more nodes even where there is no direct architectural relationship between those nodes.

A data output from network traffic analysis engine 625 may be sent via signal flow paths 608 and 602 to ontological description creation engine 613. Initially, the data may be handled by RDF API Knowledge base 620 where the data is categorized and stored utilizing a predefined entity relationship, determined by the Web Ontology Language (OWL) API 621. OWL is a family of knowledge representation languages for authoring ontologies which are a formal representation of the knowledge by a set of concepts within a domain and the relationships between those concepts. Ontologies are used to reason about the properties of that domain, and may be used to describe the domain. For example OWL API 621 may define what entity classes exist, their possible relationship to each other, and their possible state.

Figure 2:
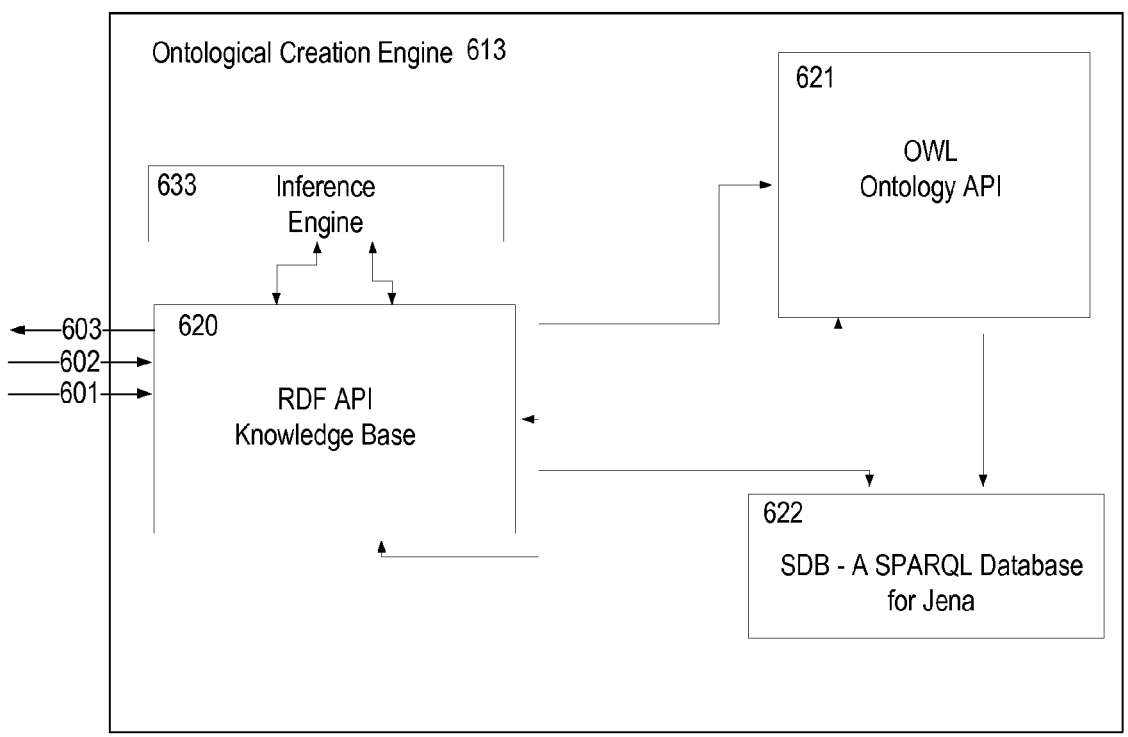
FIG. 2 is an illustrative embodiment of an ontological creation engine.

Referring now to FIG. 2, as data is received by RDF API Knowledge Base 620, logic in the RDF API Knowledge Base 620 may map the incoming data to the appropriate ontological classes and relationships defined by OWL Ontology API 621. Once the correct classes and relationships are chosen, the entity and relationship information may be entered into RDF API Knowledge Base 620. The knowledge base may also be forwarded to SPARQL database and query language SPARQL Database for Jena 622 for later inference processing by inference engine 633. Inference engine 633 may determine inferred relationships based on the ontology model contained in OWL Ontology API 621.

Other examples include inferences which ontological entities will achieve an undesired state by inferring like entities have already achieved an undesired state. The inference engine may also be employed to infer potential ontological relationships among like ontology class structures (i.e., if "VM-A has storage-A", then VM-B which is like VM-A may also be able to have storage-A for storage. Inference engine 633 may determine inferred relationships based on the ontology model contained in OWL Ontology API 621.

Figure 3:
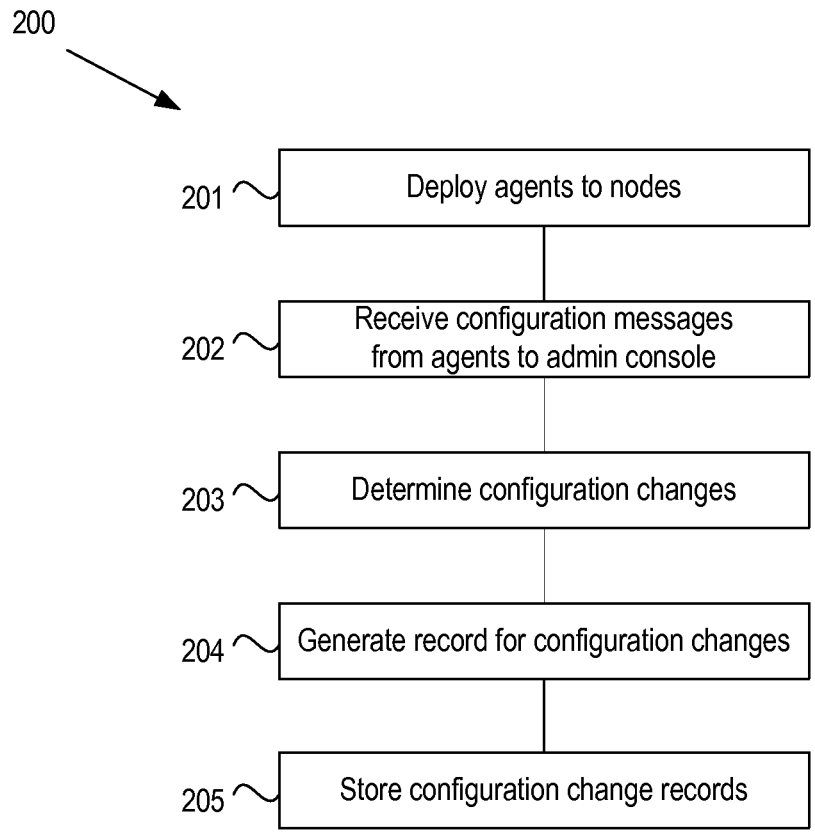
FIG. 3 depicts a flow diagram of one embodiment of a method for detecting configurations changes at nodes of the network.

Configuration information reported by the agents that provide the data for the Ontological description of the network may also be used for detecting any changes to the configurations of the nodes. Any detected changes may be visualized, to show root cause of any system performance drifts arising from these configuration changes. An exemplary method of this process is illustrated in FIG. 3. The method of FIG. 3 is performed by processing logic that may comprise hardware (circuitry, dedicated logic, etc.), software (such as is run on a general purpose computer system or a dedicated machine), or a combination of both.

Referring to FIG. 3, at block 201, agents are deployed to the nodes of the network and report configurations at their respective nodes. These configurations are received into the management console (block 202) and processed to determine any configuration changes (block 203). A record of a configuration change is created (block 204) and stored (205) for subsequent processing. This can be accomplished by a message sent from the state and profiling engine (described further below) to the database 48.

Figure 4:
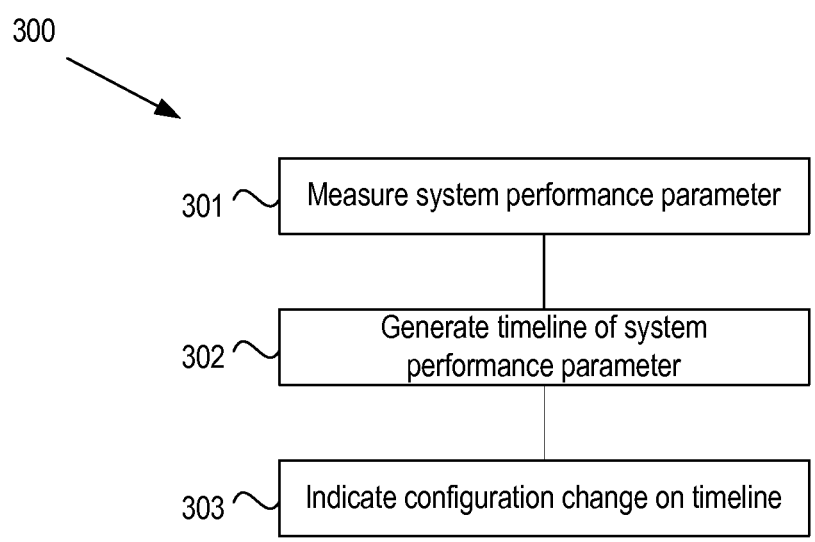
FIG. 4 depicts a flow diagram of one embodiment of a method for correlating configuration changes with system performance parameters.

FIG. 4 is a flow diagram of one embodiment of a method for correlating configuration changes with system performance parameters. The method of FIG. 4 is performed by processing logic that may comprise hardware (circuitry, dedicated logic, etc.), software (such as is run on a general purpose computer system or a dedicated machine), or a combination of both.

Referring to FIG. 4, the administration console may also determine a system performance parameter (block 301). The system performance parameter may be, for example, a system wide parameter or more localized parameter, such as relating to a specific node or a group of nodes, such as nodes that form a specific business process application service group. The system performance parameter may be measured at the administration console or may be received from agents deployed at the nodes. The administration console generates a visualization of the system performance parameter(s) over time (block 302) and includes on this visualization, an indication of a time of a configuration change (block 303).

Initially, a node will be configured to a particular baseline by a user through the administration console. The baseline provides the operating parameters of the node, including the configurations of any virtual machines. Through natural use and evolution of the network, various parameters of the node and/or particular virtual machines may drift from the assigned baseline. Such drifts may be caused by, for example, adding or deleting users, adding or deleting applications on a node, adding or deleting access permissions, etc. Drifts may also include system files that are added or removed; kernel modules (Drivers) that are added or removed, changes in CPU type and speed, Memory size, Disk size and type, etc. Other examples of configuration drifts that may be set and monitored will be apparent to the person skilled in the art.

For the most part, such configuration drifts will be small, and will have little impact on the node or the system's performance. However, in some cases, the performance of the system may be substantially affected, even by relatively minor configuration changes. In order that the cause of system performance effects can be determined, the present system generates a visual representation that displays a timeline of one or more particular performance metrics correlated with configuration changes.

In one embodiment, the configuration changes may be visualized as differences between the reported configuration and an assigned baseline. For example, a baseline comparison view may be generated by the web application 111 that shows parameters of the assigned baseline and parameters of the current configuration. Indicators may be used to highlight similarities and differences between the assigned baseline and current configuration.

The view may be generated on the web interface by selecting a particular node or a particular virtual machine. Selection causes the most recent configuration from the database 48 to be retrieved so that configuration parameters extracted from the configuration may be displayed on the interface alongside the parameters of the assigned baseline. Various indicators may be used for highlighting the similarities and differences between the assigned baseline and the current configuration.

In addition to the baseline comparison, the baseline comparison view may also display a configuration drift timeline. Configuration drift alerts can be determined by comparing a current configuration to the previously generated configuration for that node. Where differences in the configuration are reported, a configuration drift alert that details those differences is generated. The alert may include a Node ID and a time at which the configuration change was detected.

In one embodiment, the configuration drift alert details a configuration change relative to the last reported configuration, rather than relative to the assigned baseline, so that changes in the performance of the system can be directly correlated with the specific configuration changes that caused the performance to be affected.

In an alternative embodiment, the configuration drift alert may show changes between the current configuration and the assigned baseline. The configuration drift alert may be generated only the first time that a particular variation from the baseline is detected. This prevents an alert from being generated every time the configuration is reported by the agent at the node while the particular variation persists.

The configuration drifts can be detected at the administration console by analyzing the configuration messages that are periodically received from the agents deployed at the nodes. The administration console may then generate various visualizations that allow a user to determine if the root cause of a system performance change resulted from an application or configuration change. Further the system may indicate what impact these changes have on a group of nodes that perform a specific business process. For example, the impact of a change may be manifested in a resulting change in service tier threshold indicators for cpu, memory, storage, network and uptime. A change in configuration that has a resulting increase in demand on a given node may result in a manifested change in the nodes uptime to the overall business application.

Figure 5:
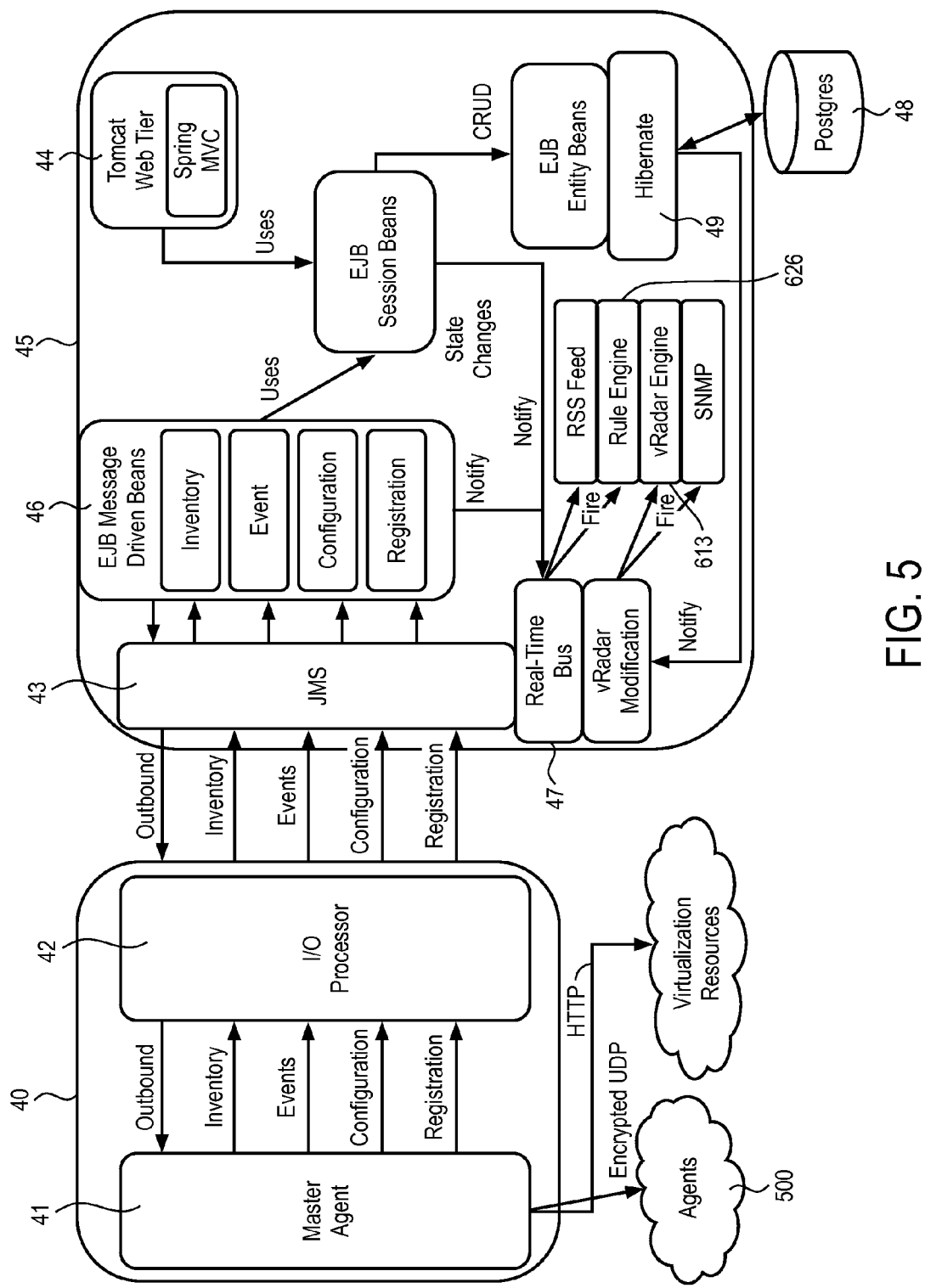
FIG. 5 is an illustrative embodiment of an administration console for a network.

When an agent first starts acquiring data, configurations from the Agent 500 are sent to the Master communication module 40 as shown in FIG. 5. The data is received at the master communication module 40 by a master agent 41 and forwarded to the I/O Processor 42 for routing to the JMS Queue 43 of the Application server 45. Once routed an Entity Java Bean (EJB) is created in the EJB Message Driven engine 46 for the Configuration message. A notification is sent to the Real-time bus 47 once the EJB Message Driven Bean engine 46 has created the entity bean. At the same time, notification is sent to the RDF (Resource Definition Frame Work) engine 620 and the OWL (Ontological Web Language) File is updated.

The agent continues to periodically report the node configuration in subsequent configuration messages which creates further configuration beans at the EJB Message driven engine 46.

The configuration bean is sent to the state and profiling engine 626 (Drools rules engine) which processes the new configuration bean to compare it against prior configuration beans for determination of a change in an assigned base line or configuration. If changes are detected, a tracking entity bean is created which represents the configuration change event. The tracking Entity bean can be used as a reference point in time for any changes to system performance that occur subsequently. The tracking entity bean is a record that describes the configuration change that was made, including parameters such as: a node ID, a reference to what baseline it is assigned and the specific changes to the baseline and/or to an earlier reported configuration of the node. The changes may relate to System Properties, Security (users and Groups), Applications, Resource Allocations (Media, CPU, Memory, System). Changes that are contained in the tracking entity bean may also be based on the virtual infrastructure messages received from the virtualization management console. These may contain memory, cpu, disk allocations, as well as infrastructure warning messages in a standard XML format. The tracking Entity beans are sent to the Database 48 as Configuration tables via an object-relational mapping (ORM) library 49 such as Hibernate. Hibernate provides a framework for mapping an object-oriented domain model to a traditional relational database and controls object-relational impedance mismatch problems by replacing direct persistence-related database accesses with high-level object handling functions. The Drools engine 626 then reports any changes in the assigned baseline to the Web tier via the Tomcat Server 44. The Web application 111 (FIG. 1) is updated with any changes to the baseline, and indications are posted to a baseline comparison view described in greater detail below. At the same time indication is sent to the Ontological view. The baseline indications are then available for the user in the performance usage views within the management console web application 111. This provides the user with a correlation of performance usage to baseline configuration change. Using these views, the user is able to correlate the root-cause for a change in the performance usage of a given node.

In one embodiment, the user, through the management console, may select a performance metric timeline to view. The management console then retrieves the performance metric data as well as any configuration change events, as indicated by any tracking entity beans. The management console then generates a visualization of the performance metric timeline overlaid with the configuration change events. By viewing this visualization, the user is able to assess when performance drifts have occurred and the configuration change events that might have triggered them. In one embodiment, the configuration change events are displayed on the performance metric timeline as hyperlinked indicators that, when selected, provide details of the configuration changes that occurred, as stored in the respective tracking entity bean.

As mentioned above, system performance may be measured by service tiers. The Service tiers for a given node contain monitored thresholds for CPU, Memory, storage, network, and uptime. In one embodiment, the monitored scale may be from 0 to 100 and the user sets what they consider to be acceptable for low critical, critical, warning, normal, high, critical high. These indicators may then be recorded at a regular interval, such as 5 minutes, and then rolled up for historical analysis.

A specific example of monitoring for a performance drift induced by a configuration change will now be described. The example includes defining a new baseline for a virtual machine at a node. The baseline provides an initial reference point from which changes may be monitored.

Figure 6:
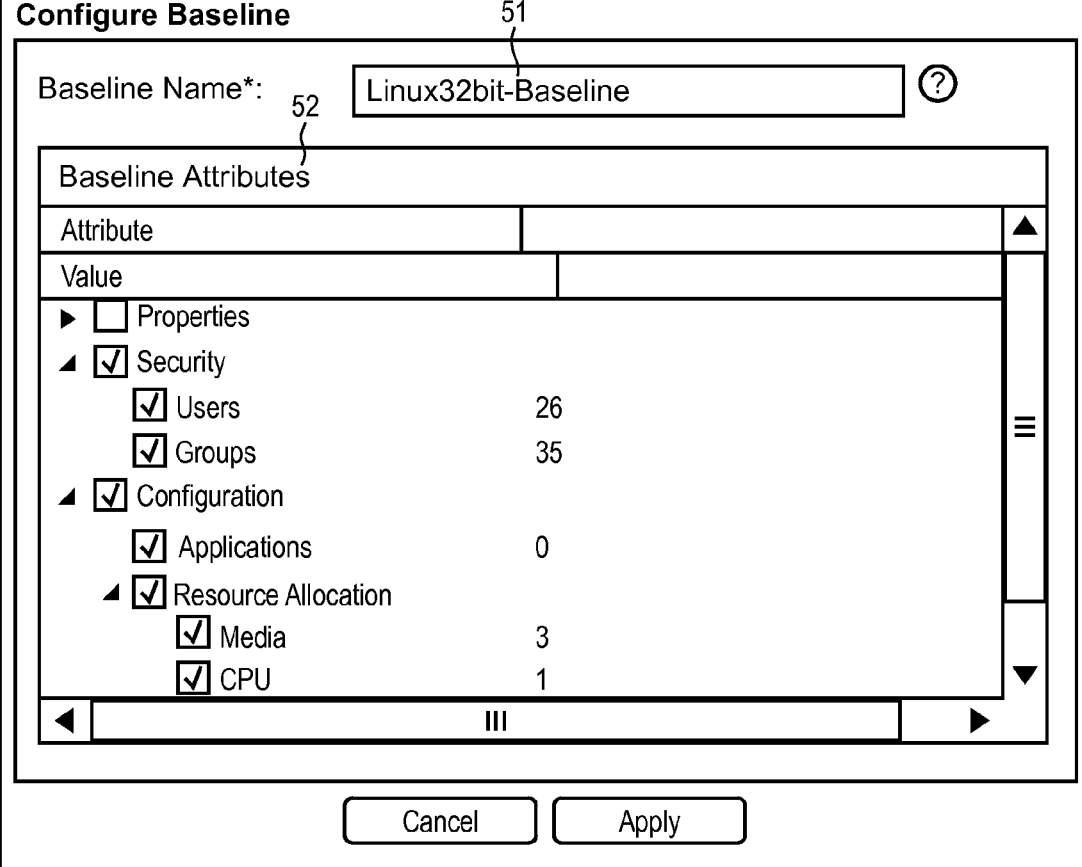
FIG. 6 depicts an interface for configuring a baseline.

As a first step, a new baseline is defined, though existing baselines may also be used. The baseline provides an example of a configuration specification for a virtual machine. An interface 50 shown in FIG. 6 may be used for creating the baseline. In the example, the user may name the baseline 51 and select and specify various attributes 52 for the baseline such as System Properties, Security (users and Groups), Applications, and Resource Allocations for Media, CPU, Memory, System, etc. These attributes are the essence of a virtual machine (node) and changes to these attributes may often have a direct effect on a system's performance, as measured by the systems service tier thresholds.

The user may also configure any baseline drift alerts by selecting which elements are required. The primary elements reported by the agents include applications, services, users, groups, network devices, local disk volumes, OS version and patch level, peripheral devices and network connections and traffic analysis.

Figure 7:
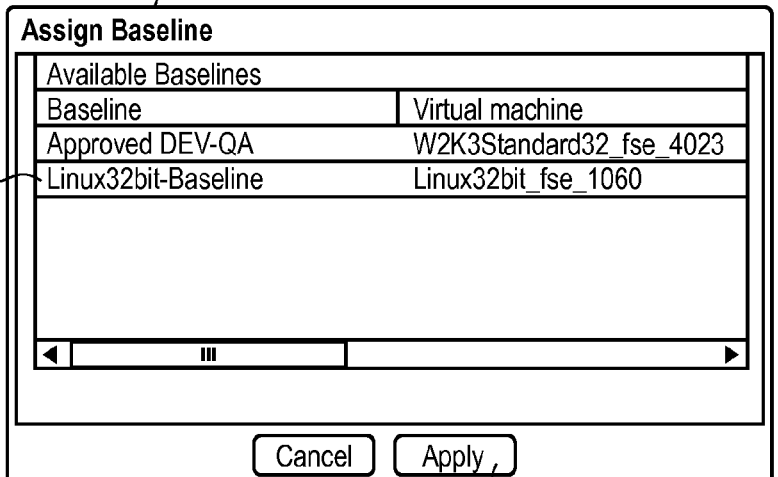
FIG. 7 depicts an interface for assigning a baseline to a node.

Using another interface window, an existing virtual machine may be selected from an inventory view that lists the virtual machines and other nodes of the enterprise network. The selected VM may then have the new baseline assigned to it. An example interface 60, shown in FIG. 7 depicts an "Assign Baseline" function, in which the newly defined baseline 51 is shown as being selectable. When the baseline 61 is selected, followed by the "Apply" button 62, the selected virtual machine is configured to have the new baseline.

When the agent subsequently reports the configuration of the node, the configuration will be compared to the newly assigned baseline to determine whether any parameters of the configuration are outside of the allowable limits set by the baseline. Over time, natural use and evolution of the network will cause changes to occur. The agent at the node will continue to report the current configuration of the node by way of configuration messages. These messages are received at the state and profiling engine 626 as a configuration bean that details the relevant data elements including: node ID, System Properties, Security (users and Groups), Applications, Resource Allocations (Media, CPU, Memory, System). Virtual infrastructure messages received from the virtualization management console are also communicated via the agents and these may indicate memory, cpu, disk allocations by the infrastructure and infrastructure warning messages provided by the vendor management system such as VMware ESX Server. The state and profiling engine 626 analyzes the configuration beans to determine whether there are any departures from the assigned baseline. Configuration changes either relative to the baseline or to a previously reported configuration cause the state and profiling engine 626 to create a corresponding tracking entity bean that details the changes that have been made and the timing of these changes. In one embodiment, tracking beans may be created for every detected configuration change. In an alternative embodiment, tracking beans may be created only for configuration changes that violate previously defined allowable baseline drifts. In a further alternative, a combination of these methods may be utilized so that, for example, tracking beans may always be created for drifts in some parameters yet selectively created for drifts in other parameters.

In some instances, configuration drifts will persist on the node which would cause tracking beans to be created each time the agent reports the node configuration. To avoid persistent configuration drift alerts from being generated, comparisons may be made between a configuration report from the agent and earlier tracking beans for that node so that tracking beans are created only for new configuration drifts.

Departures from the baseline may be analyzed by viewing a baseline comparison report for a particular machine or node. A user may view a baseline comparison report by, for example, clicking on a link for the virtual machine in the UI. The click request fires an Ajax call back to the appropriate Spring MVC Controller and then Node ID and Date ranges are passed in. The Controller receives the ajax call and the Node ID, Start Date, Stop Date parameters and the Spring Controller injects the EventChart EJB Stateless Session Bean containing the business logic for creating the chart data. The Spring Controller calls the GenerateEventChart method of the EventChart bean, passing in the node and date range data filters. An EventChart bean queries the Event table and the Performance Metric tables with appropriate data filters and the EventChart bean iterates over the two record sets populating a data structure with each Event point and time and each performance metric point and time. The EventChart bean then returns the populated datastructure to the Spring Controller, which converts Java POJO records to JSON and XML data. The Spring Controller returns the results back to the browser through a JSP and into Flex, which renders the chart.

Figure 8:
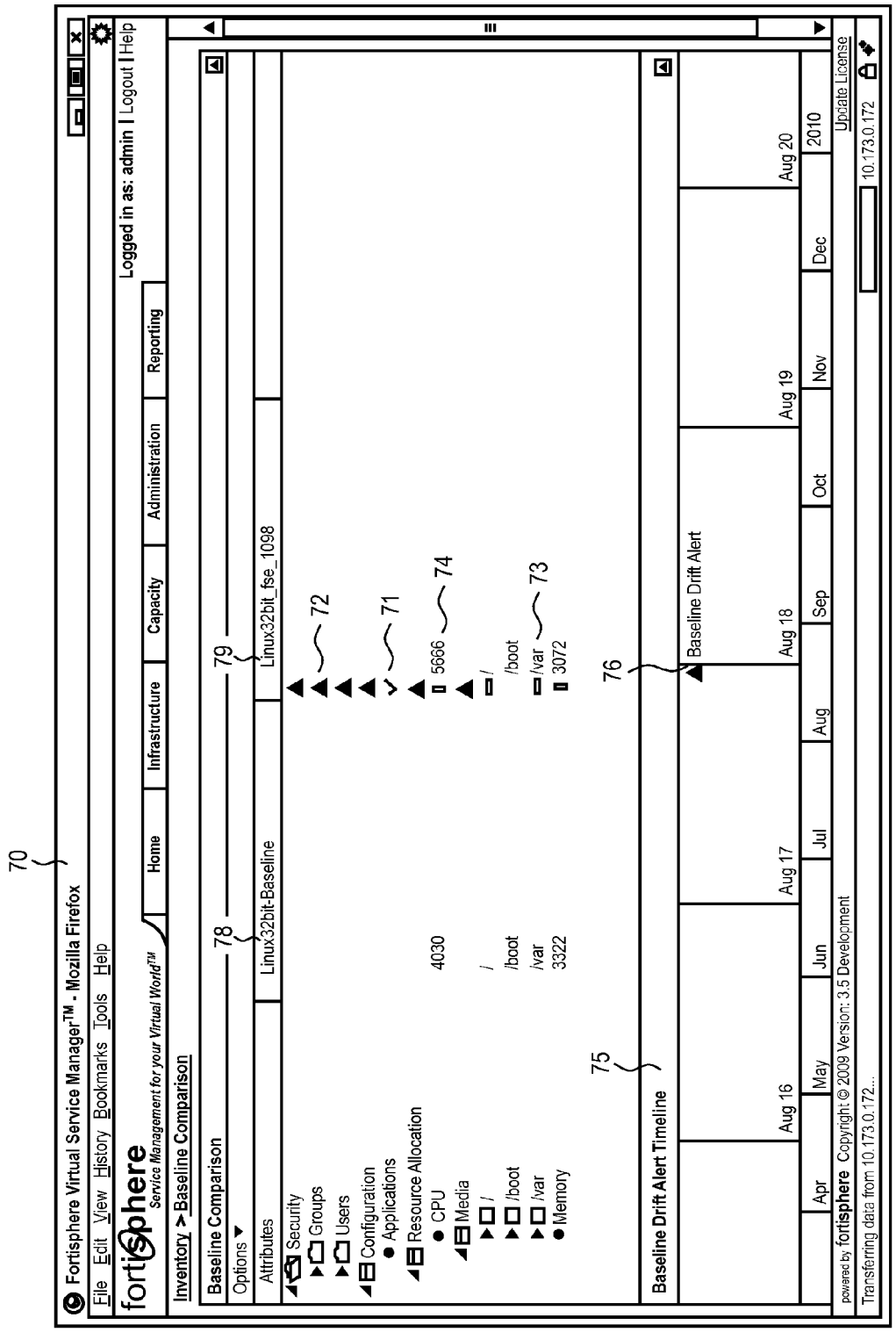
FIG. 8 depicts a visualization of a baseline comparison report.

An example baseline comparison report is shown in FIG. 8. The baseline comparison report 70 shows the baseline parameters 78 and the parameters for the virtual machine 79. Indicators can be used in the virtual machine list to show similarities and differences with the assigned baseline. For example, a green check mark 71, can be used to indicate that the configuration for that VM is the same as the baseline to which it was assigned. An alternative indicator, such as a red triangle 72, can be used to indicate that there is a difference between the configuration and the baseline. More detail may be indicated. For example, the minus symbol 73 may indicate that the Virtual Machine does not have the element of the assigned baseline, while the exclamation mark 74 may indicate that the virtual machine has a different value for the item than the assigned baseline.

Also shown on the web application interface 111 is a Baseline Drift Alert Timeline 75. The tracking entity bean is represented on the timeline 75 as an indicator 76 which indicates when configuration changes were made.

Figure 9:
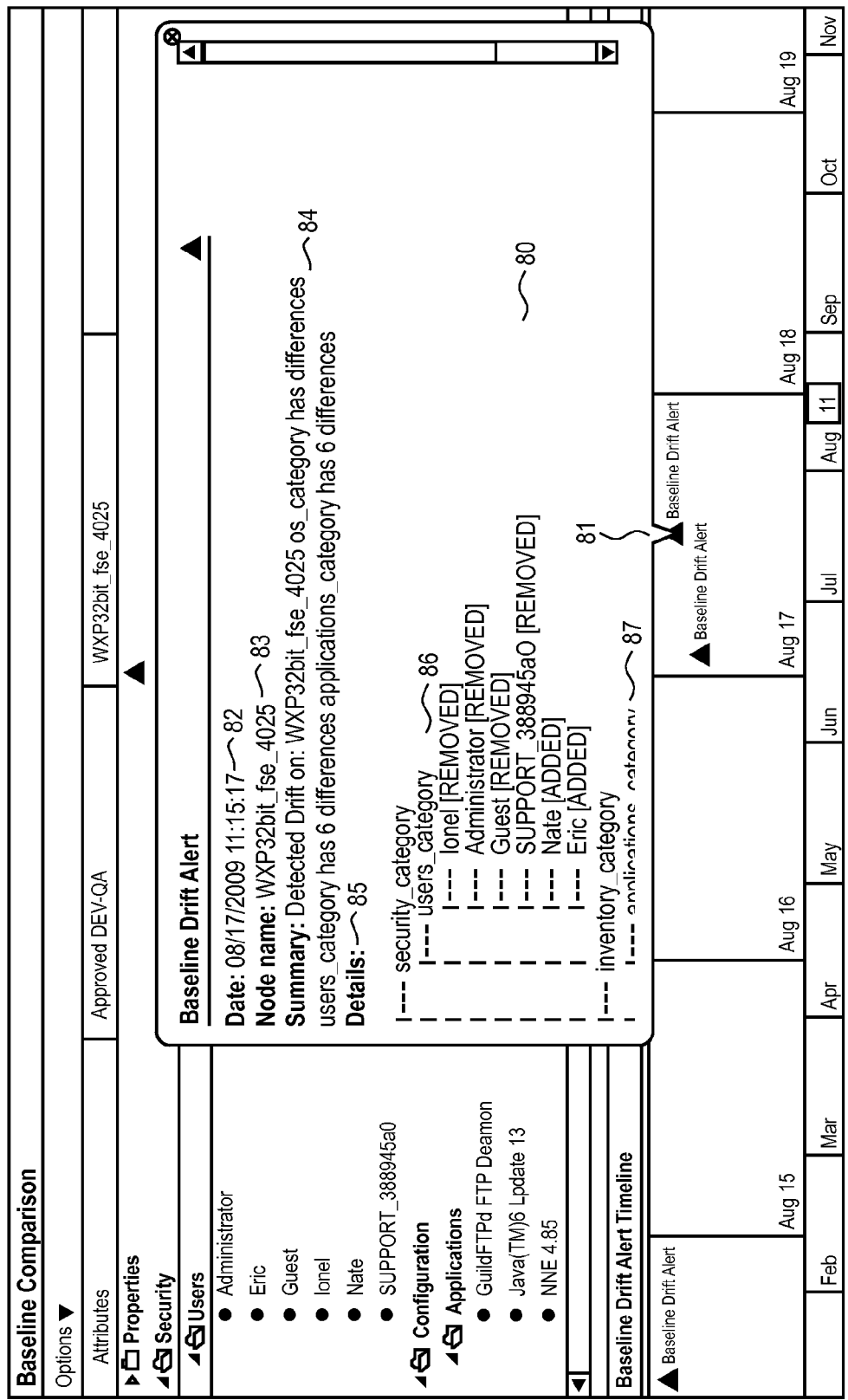
FIG. 9 depicts a visualization of a detailed configuration change report.

The indicator 76 may be presented as a hyperlink that, when selected, presents details stored in the respective tracking entity bean that describes the configuration changes that were made. Thus, by selecting any of the indicated folders or status indicating symbols, the user may drill down the data to obtain a more detailed view of the elements that affect and create the status indications. For example, FIG. 9 shows a detailed view 80 for the baseline drift alert 81. The detailed view 80 describes a time of the configuration change event 82, the node 83 and summary of the changes 84. In this example, the summary indicates that the "users_category" has six differences relative to the assigned baseline and the "applications_category" has six differences.

The changes are specified in a scrollable detailed list 85. The detailed list shows the users that have been added and removed in a detailed list of the users_category 86 as well as elaborating details of the applications_category 87.

Figure 10:
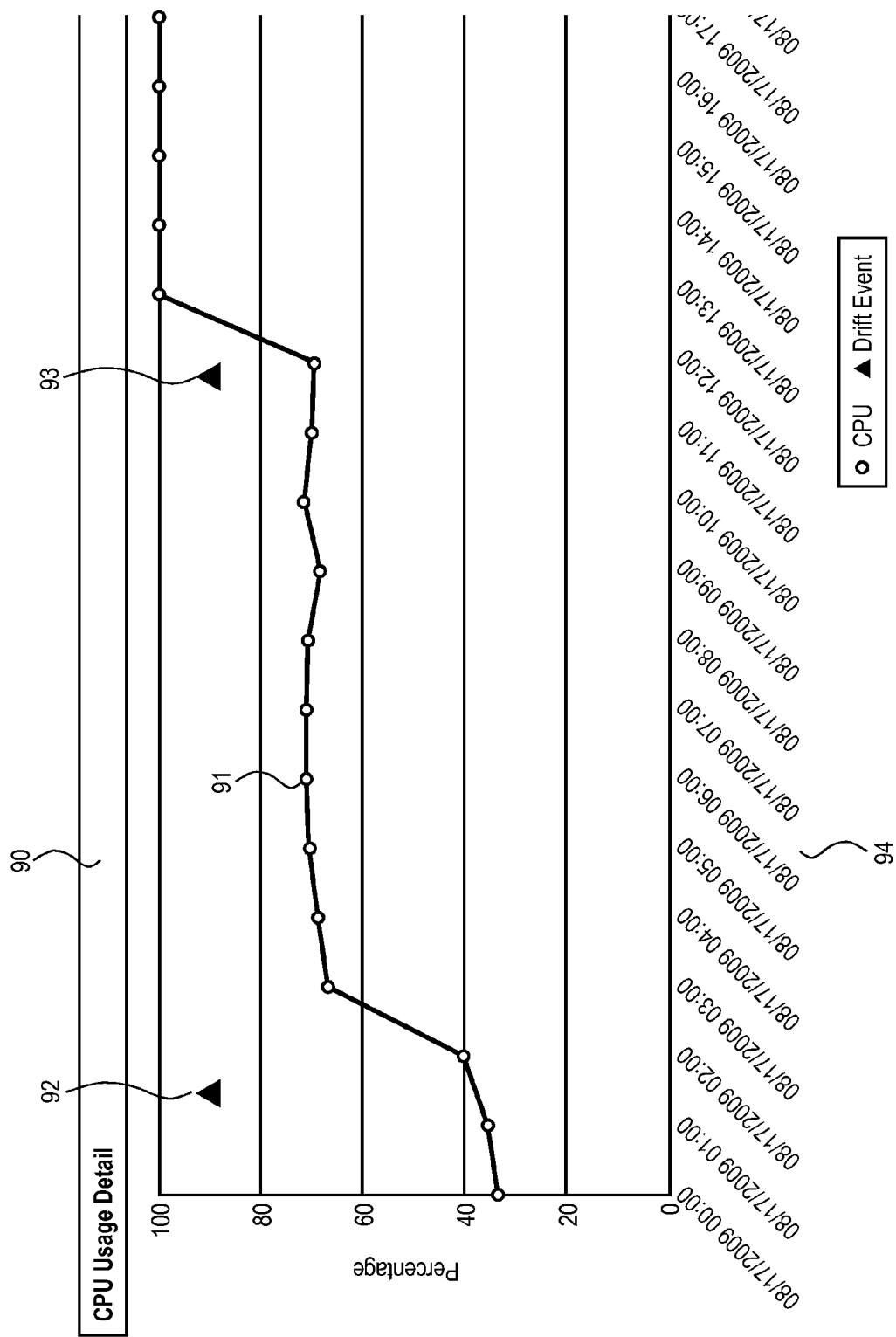
FIG. 10 depicts a visualization of a correlation between a system performance parameter and configuration changes.

The web application and management console may be configured to generate a view in which the Baseline Drift Alert Timeline is overlaid onto a system performance timeline to allow a user to view system performance changes. In FIG. 10, an overlaid view 90 includes a timeline 94 and a plot of the CPU usage 91. Baseline drift alerts, with drill down features to details of those baseline drifts, are indicated by hyperlink indicators 92, 93. While the system performance shown in FIG. 9 is CPU usage, other system performance parameters that may be apparent to a person skilled in the art could also be displayed. The system performance can be system wide performance or limited to a group of nodes, the functioning of a particular application, etc. For example, as described above, service tier parameters timelines may be selected and displayed in correlation with the configuration change event indicators. In one embodiment, service tier performance may be displayed and any violations indicated on the timeline. Such violations will be indicated with any baseline drift alerts, thereby enabling the user to determine which configuration drifts caused the service tier violations.

The display 90 showing correlations between the system performance parameters and the configuration changes on the nodes, allows a user to analyze the root cause of system performance problems. In the example shown, the CPU usage 91 is shown to increase sharply immediately after the configuration change indicated by indicator 93 was made. The system administrator may view the details of the configuration change event 93 to ascertain whether the cpu usage should have increased in this way, or whether a problem exists that requires some remedial action to be taken.

When generating the view 90, the database 48 is accessed to retrieve any relevant tracking entity beans. The configuration events that are displayed on the view 90 may be dependent on the particular node or group of nodes for which a performance metric is being displayed. For example, if the system performance for a group of nodes is being shown, a query may be sent to the database with relevant Node IDs so that all tracking beans that reference one or more of those node IDs will be returned and subsequently indicated on the view 90. Timing filters can be applied to the query so that only configuration alerts within the relevant time window will be retrieved.

While the example has been described with reference to a virtual machine, physical machines and nodes and entities within a cloud infrastructure may be analyzed in a similar manner.

Figure 11:
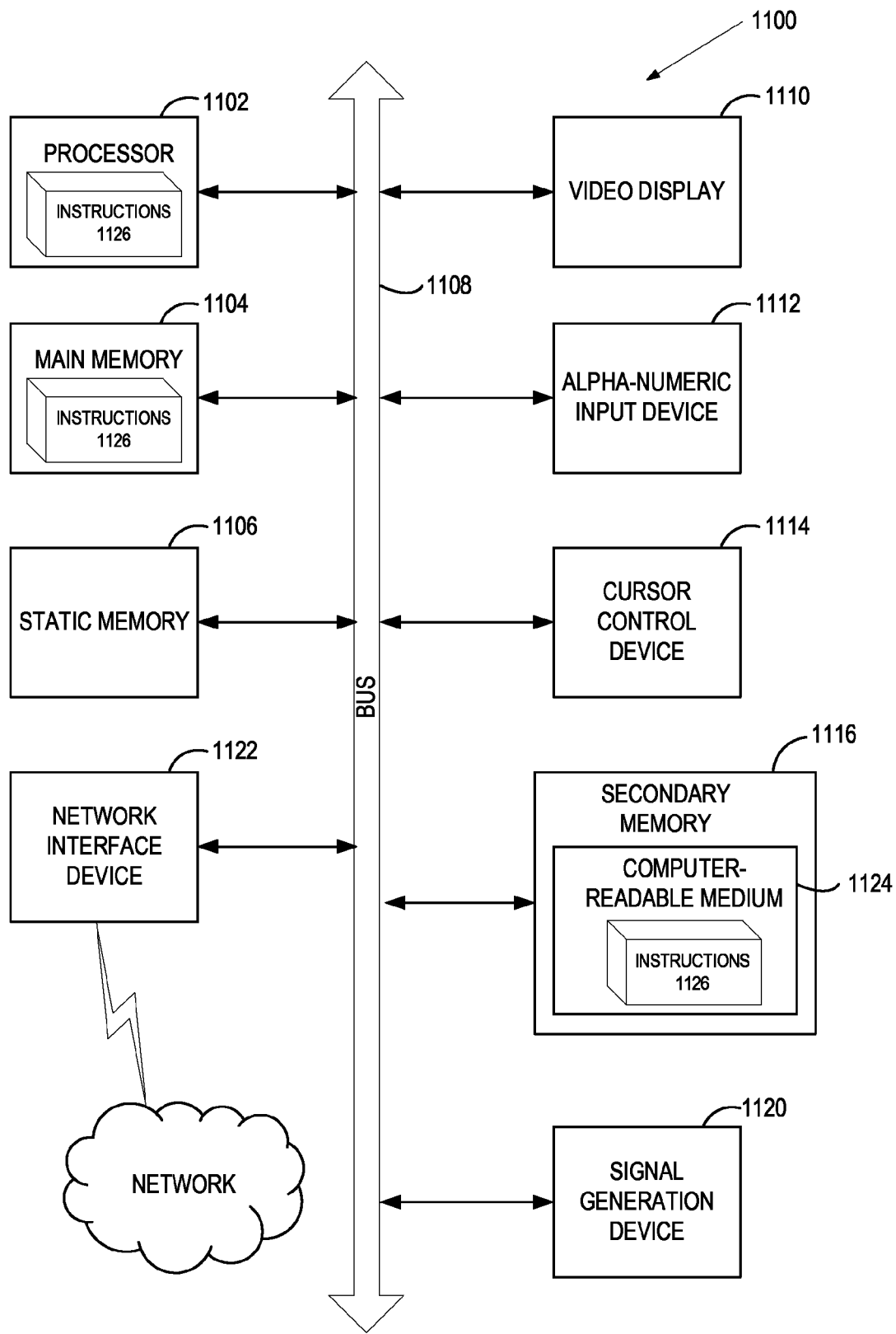
FIG. 11 is a block diagram of an exemplary computer system that may perform one or more of the operations described herein.

FIG. 11 illustrates a diagrammatic representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) such as synchronous DRAM (SDRAM) or Rambus DRAM (RDRAM), etc.), a static memory 1106 (e.g., flash memory, static random access memory (SRAM), etc.), and a secondary memory 1116 (e.g., a data storage device), which communicate with each other via a bus 1108.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. Processing device 1102 is configured to execute instructions 1126 for performing the operations and steps discussed herein.

The computer system 1100 may further include a network interface device 1122. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1120 (e.g., a speaker).

The secondary memory 1116 may include a machine-readable storage medium (or more specifically a computer-readable storage medium) 1124 on which is stored one or more sets of instructions 1126 embodying any one or more of the methodologies or functions described herein. The instructions 1126 may also reside, completely or at least partially, within the main memory 1104 and/or within the processing device 1102 during execution thereof by the computer system 1100, the main memory 1104 and the processing device 1102 also constituting machine-readable storage media.

The machine-readable storage medium 1124 may also be used to store software performing the operations discussed herein, and/or a software library containing methods that call this software. While the machine-readable storage medium 1124 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Some portions of the detailed description above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "determining", "encrypting", "decrypting", "sending" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   deploying an agent to a node of a network, the node hosting at least one virtual machine;
   receiving, at an administration console, a configuration message from the agent via the network, the configuration message specifying a current configuration of the node, the current configuration comprising current configuration parameters of the virtual machine;
   determining, by a processing device of the administration console, a configuration change of the node from the current configuration specified in the configuration message;
   generating a configuration change record comprising at least one configuration parameter of the virtual machine in the configuration change;
   storing the configuration change record; and
   generating a visualization of the configuration change on a display using the configuration change record, the visualization comprising a timeline and an indication of the timing of the configuration change on the timeline to assist in determining whether a performance change of the virtual machine has resulted from the configuration change.

2. The method according to claim 1 further comprising determining the configuration change relative to a baseline assigned to the node.

3. The method according to claim 1 further comprising determining the configuration change relative to a previously received configuration message.

4. The method according to claim 1 wherein the timeline comprises a hyperlink indicator of the configuration change that, when selected, displays a detail of the configuration change.

5. The method according to claim 1 wherein the timeline comprises a performance metric of the network.

6. The method of claim 5 wherein the performance metric comprises a performance metric of the node on which the configuration change occurred.

7. The method according to claim 1 further comprising:
   determining the configuration change relative to a defined baseline alert; and
   generating the configuration change record if the configuration satisfies a requirement of the defined baseline alert.

8. A method comprising:
   deploying an agent to a node of a network, the node hosting at least one virtual machine, the agent to communicate a configuration of the respective node in a communication message, the configuration comprising current configuration parameters of the virtual machine;
   receiving, at an administration console, a configuration message from the agent via a network;
   determining, by a processing device of the administration console, a configuration change of the node from the current configuration specified in the configuration message, the configuration change comprising at least one configuration parameter of the virtual machine;
   recording a system performance parameter for the node, the system performance parameter pertaining to a performance of the virtual machine;
   generating a visualization of a timeline for the system performance parameter; and
   providing on the visualization an indication of a time of the configuration change to assist in determining whether a performance change of the virtual machine has resulted from the configuration change.

9. The method of claim 8 further comprising:
   defining a baseline configuration at the administration console; and
   applying the baseline configuration from the administration console to the node of the network.

10. The method of claim 9 further comprising:
    determining the configuration changes relative to the assigned baseline configuration;

generating a visualization of the configuration changes relative to the assigned baseline configuration; and displaying the visualization of the configuration changes relative to the assigned baseline configuration.

11. The method of claim 8 further comprising displaying the configuration change as an indicator on the timeline, the indicator comprising a hyperlink that links to details of the configuration change.

12. The method according to claim 8 wherein processing the configuration message at the administration console further comprises:

comparing a configuration report from the configuration message of the agent to a stored configuration at the administration console.

13. The method according to claim 8 wherein the performance parameter comprises a service tier parameter of a business process.

14. The method according to claim 8 further comprising generating a configuration change record that represents a configuration change event and describes the configuration change of the configuration change event, the method comprising providing a hyperlink on the visualization indicating the configuration change event that, when selected, displays details from the configuration change record.

15. The method according to claim 8 further comprising:

receiving a selection of the system performance parameter to the administration console;

determining a node associated with the selected performance parameter;

determining any configuration changes for the node; and displaying indications of the configuration changes on the visualization.

16. A system comprising:

an administration console to:

receive, via a network, an indication of a configuration of a node from an agent deployed to the node, the node hosting at least one virtual machine, the agent to report the configuration of the node to the administration console via the network, the configuration comprising current configuration parameters of the virtual machine;

compare the received configuration with a stored configuration to determine a configuration change for the node, the configuration change comprising at least one configuration parameter of the virtual machine;

generate a timeline of configuration changes for the node; and provide a display of the timeline to a user to assist in determining whether a performance change of the virtual machine has resulted from the configuration change.

17. The system of claim 16 wherein the administration console is further to:

receive a measurement of a performance parameter from the agent; and display the measurement of the performance parameter on the timeline.

18. The system of claim 16 wherein the administration console is further to display the indication of the configuration change on the timeline as a hyperlink that, when selected, displays a parameter of the configuration change.

19. A non-transitory computer readable medium including instructions that, when executed by a processing device, cause the processing device to perform operations comprising:

deploying an agent to a node of a network, the node hosting at least one virtual machine;

receiving, at an administration console, a configuration message from the agent via the network, the configuration message specifying a current configuration of the node, the current configuration comprising current configuration parameters of the virtual machine;

determining, by a processing device of the administration console, a configuration change of the node from the current configuration specified in the configuration message;

generating a configuration change record comprising at least one configuration parameter of the virtual machine in the configuration change;

storing the configuration change record; and generating a visualization of the configuration change on a display using the configuration change record, the visualization comprising a timeline and an indication of the timing of the configuration change on the timeline to assist in determining whether a performance change of the virtual machine has resulted from the configuration change.

* * * * *